Patented Dec. 1, 1942

2,303,603

UNITED STATES PATENT OFFICE 2,303,603

TARTARIC ACID PRODUCTION

Geza Braun, New York, N. Y., assignor to Standard Brands Incorporated, New York, N. Y., a corporation of Delaware No Drawing. Application August 3, 1940,
Serial No. 351,160

6 Claims. (Cl. 260—536)

The invention relates to a process for the production of tartaric acid, and more especially to such production from calcium tartrate. It includes correlated inventions and discoveries whereby the manufacture of tartaric acid is facilitated.

The production of tartaric acid from calcium tartrate has entailed the addition of a slight excess of sulfuric acid to an aqueous suspension of the tartrate. The concentration of the tartaric acid obtained depends upon the quantity of water taken, and this is dependent upon the consistency of the calcium sulfate suspension resulting from the reaction. This suspension desirably is in the form of a thin paste so that it may be handled with ease in the subsequent operations. Because of these factors it has not been practical to produce tartaric acid in a concentration greater than 25%, although it is desirable to manufacture the acid in a more concentrated form.

An object of the invention is to provide a process in accordance with which a concentrated solution of tartaric acid may be obtained.

A further object of the invention is the provision of a procedure which may lead to the production of tartaric acid in crystalline form.

An additional object of the invention is to provide a procedure for the manufacture of tartaric acid from calcium tartrate without distillation.

A more specific object of the invention is the provision of a process which produces tartaric acid from calcium tartrate, said tartrate being treated with sulfuric acid in relatively strong solutions of tartaric acid.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention tartaric acid may be obtained through the interaction of calcium tartrate suspended in a tartaric acid solution with sulfuric acid. The tartaric acid solution in which the calcium tartrate is suspended may have a relatively high concentration, e. g., from 10–30° Bé., i. e., 16–50%, and as a result of the process weaker solutions of tartaric acid are made distinctly more concentrated, such as 15–30° Bé. Further, these stronger tartaric acid solutions are produced without the necessity of subjecting the solutions to distillation for concentration.

I have found that calcium tartrate may be reacted or decomposed with sulfuric acid to substantial completion not only in water and weak tartaric acid solutions, but also in such solutions of relatively high concentration, and even under conditions of supersaturation. This makes it possible to produce concentrated and supersaturated solutions of tartaric acid without an attending distillation. Thus, if a 25% tartaric acid solution is used as the medium in which the calcium tartrate is suspended and reacted with sulfuric acid instead of water, the reagents being used in the proper proportions, there is obtained a 50% tartaric acid solution. When this solution is used as the medium in which calcium tartrate is reacted with sulfuric acid, there may be obtained a tartaric acid solution of 75% concentration.

Proceeding in this manner I have obtained crystalline tartaric acid without any distillation. However, I have found that in manufacturing operations it is desirable that the concentration of tartaric acid should not exceed approximately 40%. At this concentration the acid may be readily handled and the calcium sulfate filter cake may be washed free from acid with ease, and especially so when employing the countercurrent principle. Should an acid of higher tartaric acid content be produced, it would be difficult to separate from calcium sulfate because of its viscosity. Moreover, the use of calcium tartrate in a moist condition makes it desirable to carry the reaction to a tartaric acid concentration of 40%. On the other hand, utilization of dry calcium tartrate with concentrated sulfuric acid will yield a supersaturated tartaric acid solution, and from this the crystalline tartaric acid will separate upon cooling.

Production of tartaric acid may be effected in an apparatus comprising reaction vessels or cookers of suitable size provided with stirring means and heating means which may be in the form of suitable steam coils. Separation of calcium sulfate from liquor may be accomplished by a filter press or centrifuge, and the handling of liquors or tartaric acid solutions of differing concentration is brought about by employment of suitable reservoirs or storage tanks, and in conjunction therewith there may be provided a preheater.

As an illustrative embodiment of a manner in which the invention may be practiced the following description is given. Into a vessel of suitable size there may be placed about 750 gallons of a strong tartaric acid liquor or solution, i. e., one having a tartaric acid concentration of about 25%, and to this there may be added wet calcium tartrate in an amount sufficient to yield about 1500 lbs. of tartaric acid. The mass is heated to about 120° F., and there is then introduced about 100 lbs. of 93% sulfuric acid as a slow stream requiring about 15 minutes for its incorporation. The reaction mass becomes heated to a temperature of about 150 to 160° F., and is maintained at this temperature with stirring for a period of about a half hour. Calcium sulfate which is formed by reaction between the calcium tartrate and the sulfuric acid is separated from the liquor or tartaric acid solution in a suitable manner, as by introduction into a filter press, under a pressure of from 6 to 8 lbs. The filtrate or solution of tartaric acid is placed in a reservoir and the calcium sulfate subjected to a first washing, preferably by means of a tartaric acid solution having a concentration of about 14%, and previously heated. The wash liquor or filtrate becomes enriched in tartaric acid to about 25%, and may be used as the liquid medium in which to suspend calcium tartrate in a subsequent conversion.

The calcium sulfate may be given a second washing with a tartaric acid solution having a concentration of about 2.5%, and this may be followed with a final washing with hot water. The second washing gives a liquor having a tartaric acid content of from about 10 to 14%, and the hot water wash leads to a tartaric acid solution of about 2.5%. The process consequently yields a finished liquor or tartaric acid solution, and weaker or wash solutions containing about 25%, 14% and 2½% respectively of tartaric acid. The 25% solution, as indicated, is employed as the reaction medium for a subsequent conversion, and the weaker liquors serve as washing media, they being preheated prior to contacting with the calcium sulfate cake. Separation of the calcium sulfate from hot solutions and a washing of the separated calcium sulfate with hot solutions of tartaric acid, generally about 140-160° F., markedly decreases the time required for carrying out these operations.

When the procedure has been carried through with careful attention to the conditions, it is found that the calcium sulfate, following the final washing, contains very little, if any, tartaric acid. Further, the above described procedure effects a balance with respect to the various liquors, and an acid is obtained ready for purification and distillation, if desired, having a concentration of about 36-40%. Consequently, any distillation of tartaric acid solutions of low concentration is obviated with an attending marked economy in manufacturing costs. Moreover, it is desirable and an advantage of the outlined procedure that a slight excess of sulfuric acid only is required to bring about decomposition of the calcium tartrate, and this improves the conditions attending subsequent distillation and crystallization of tartaric acid.

It will be realized that tartaric acid may be obtained in like manner from other tartrates, of which a metal constituent yields an insoluble sulfate. Examples thereof are barium, strontium and similar tartrates.

Since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of tartaric acid, which comprises initially suspending calcium tartrate in a concentrated tartaric acid solution, reacting with sulfuric acid, separating calcium sulfate and tartaric acid solution thus produced allowing tartaric acid to crystallize from the solution and subsequently removing crystalline tartaric acid therefrom.

2. A process for the production of tartaric acid, which comprises initially suspending calcium tartrate in a concentrated tartaric acid solution at a temperature of about 120° F., reacting with sulfuric acid and maintaining at a temperature of 150-160° F., and separating calcium sulfate and tartaric acid solution thus produced allowing tartaric acid to crystallize from the solution and subsequently removing crystalline tartaric acid therefrom.

3. A process for the production of tartaric acid, which comprises initially suspending calcium tartrate in a tartaric acid solution having a concentration of about 10 to about 30° Bé., reacting with sulfuric acid, separating calcium sulfate and tartaric acid solution thus produced allowing tartaric acid to crystallize from the solution and subsequently removing crystalline tartaric acid therefrom.

4. A process for the production of tartaric acid, which comprises initially suspending calcium tartrate in a tartaric acid solution having a concentration of about 25% at a temperature of about 120° F., reacting with concentrated sulfuric acid, maintaining the reaction mass thus obtained at a temperature of 150-160° F., separating calcium sulfate and tartaric acid solution thus obtained allowing tartaric acid to crystallize from the solution and subsequently removing crystalline tartaric acid therefrom.

5. A process for the production of tartaric acid, which comprises initially suspending a metal salt of tartaric acid in which the metal is capable of reacting with sulfuric acid to form an insoluble sulfate in a concentrated tartaric acid solution, reacting with sulfuric acid, separating insoluble sulfate and tartaric acid thus produced allowing tartaric acid to crystallize from the solution and subsequently removing crystalline tartaric acid therefrom.

6. A process for the production of tartaric acid, which comprises initially suspending dry calcium tartrate in a hot saturated tartaric acid solution, reacting concentrated sulfuric acid therewith, separating calcium sulfate and tartaric acid solution thus produced, cooling the tartaric acid solution whereby the acid crystallizes therefrom, and subsequently removing the crystalline tartaric acid therefrom.

GEZA BRAUN.